J. W. FITZGERALD.
AUTOMATIC BELT TENSIONING MEANS FOR DRIVE MECHANISM.
APPLICATION FILED JAN. 18, 1917.

1,242,166.  Patented Oct. 9, 1917.

Inventor
John W. FitzGerald

By Whittemore Hulbert & Whittemore
Attorneys

UNITED STATES PATENT OFFICE.

JOHN W. FITZGERALD, OF DETROIT, MICHIGAN.

AUTOMATIC BELT-TENSIONING MEANS FOR DRIVE MECHANISM.

1,242,166.  Specification of Letters Patent.  Patented Oct. 9, 1917.

Application filed January 18, 1917. Serial No. 143,163.

*To all whom it may concern:*

Be it known that I, JOHN W. FITZGERALD, a citizen of the United States of America, residing at Detroit, in the county of Wayne and State of Michigan, have invented certain new and useful Improvements in Automatic Belt-Tensioning Means for Drive Mechanism, of which the following is a specification, reference being had therein to the accompanying drawings.

The invention relates to driving mechanism employing a friction belt transmission and operating under conditions of varying speed and load. The invention consists in a novel construction by means of which the tension on the belt is automatically varied in proportion to the load as hereinafter set forth.

Figure 1:
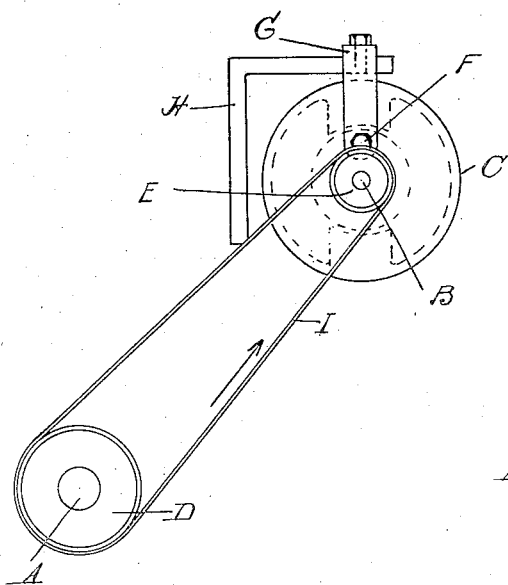
Figure 1 is an elevation of the mechanism.
Figure 2:
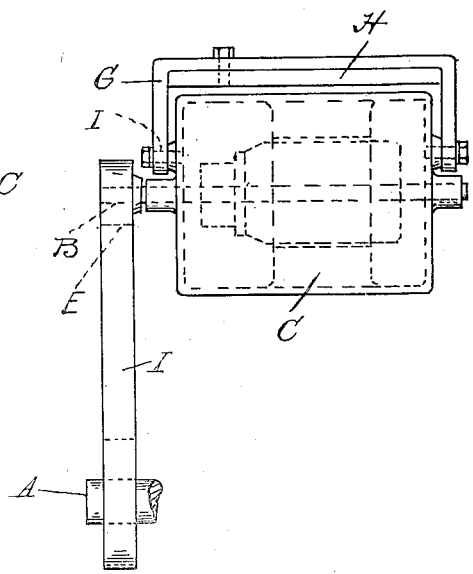
Fig. 2 is an elevation at right angles to Fig. 1.

A is the drive shaft and B is the driven shaft, the latter being, as specifically shown, the rotor of an electric generator C. D is a drive pulley on the shaft A and E is a driven pulley on the shaft B. To maintain a tension on the pulley proportionate to the load the generator C instead of being mounted upon a stationary support is suspended from a pivotal support F which is eccentric to the axis of the rotor shaft B. As shown this support comprises a strap G which embraces the generator and engages the pivots F, said strap being secured to a bracket H mounted upon any suitable fixed bearing. I is a friction belt engaging the pulleys D and E and rotating in the direction indicated by the arrow. This will drive the rotor in such direction with reference to its stator that, where there is an increased magnetic load tending to rotate the stator with the rotor the former will be swung outward or in a direction to increase the tension on the belt. On the other hand where there is a decrease in the magnetic load the stator is permitted to swing oppositely or in a direction to decrease the tension on the belt. The initial tension on the belt may be produced either by a slight deflection of the generator to one side of its point of rest or by any other suitable tensioning means.

In operation, the tension upon the belt is the result of two factors. There is first the tension produced by the weight generator or other tensioning means and second the tension produced by the inertia of the rotor when there is an increase in load or magnetic resistance. Consequently the tension upon the belt may be maintained at the minimum required for driving the generator under varying conditions of load and speed, said tension being automatically varied as required.

What I claim as my invention is:

1. The combination with a drive mechanism and an electric generator driven thereby, of a friction belt transmission between said drive mechanism and the rotor of said generator, a pivotal support for said generator eccentric to the axis of said rotor and arranged to increase the tension on the belt where the magnetic load is increased.

2. The combination with a drive mechanism, and an electric generator driven thereby, of a friction belt transmission therebetween, a driven pulley engaging said belt mounted on the rotor shaft of said generator, a pivotal support for the stator of the generator eccentric to and above the rotor shaft for the purpose described.

3. The combination with a dynamo electric machine, of pivotal supports for said machine spaced from the shaft of the rotor thereof, a friction transmission couple, one member of which is carried by said shaft, said couple being arranged to increase the friction when the magnetic load is increased.

4. The combination with a dynamo electric machine, of a supporting bracket for the same including depending arms at each extremity thereof, means pivotally engaging said arms with said machine at a point eccentric to the axis thereof, and a friction belt drive transmission associated with said machine and arranged to increase the tension on the belt when the magnetic load is increased.

In testimony whereof I affix my signature.

JOHN W. FITZGERALD.